Patented May 20, 1941

2,242,911

UNITED STATES PATENT OFFICE 2,242,911

COMPOSITION OF MATTER AND METHOD AND STEP OF MAKING AND USING THE SAME

Mortimer T. Harvey, East Orange, N. J., assignor to The Harvel Corporation, a corporation of New Jersey No Drawing. Application May 3, 1939, Serial No. 271,515

10 Claims. (Cl. 167—24)

The present invention relates to insecticidal solutions in which insecticidal rotenone products serve as the effective insecticide, petroleum oil is used as the diluent and carrier, and phenol-aldehyde resins which are soluble in petroleum oils and which will dissolve the rotenone products serve to hold the latter in solution in the petroleum oils.

The phenols used in making the phenol-aldehyde condensation products suitable for use in the practice of the present invention are phenols having long hydrocarbon side-chain substituents on the nucleus thereof. Some of these long hydrocarbon side-chain substituted phenols are found to be naturally occurring in the juices of plants of the Anacardiaceae family. Examples of these, defined phenols are cashew nut shell liquid; marking nut shell liquid; the juice of the Japanese lac plant, the naturally occurring phenolic constituents of cashew nut shell liquid, of marking nut shell liquid and of the juice of the Japanese lac plant, for example, anacardic acid, cardol, anacardol, urushiol, and other long hydrocarbon side-chain substituted phenols found in these juices. Further examples are phenols and other compounds which are derivatives of the above defined phenols, that is, cardanol; any of the above defined phenols which has been modified by hydrogenation to satisfy the unsaturated bond of the long hydrocarbon side-chain, including hydrogenated cardanol; acid treated cashew nut shell liquid; slightly polymerized cashew nut shell liquid; acetic acid derivatives of any of the above phenols such as cardanoxy acetic acid; acetates of any of the above phenols.

Still further examples of phenols suitable for making phenol aldehyde condensation products suitable for use in the practice of the present invention are phenols having hydrocarbon side-chains of four or more carbons on the nucleus of the phenol and which give oil soluble condensation products with an aldehyde, for example, the group of phenols from the several butyl phenols to phenols having twenty carbon atoms in one or more groups on the nucleus, but with at least one of the readily reactive positions (ortho and para) unoccupied. Particular examples are p-tertiary butyl phenol, any lauric phenol, and hydrogenated cardanol and general examples are those phenols which give oil soluble resins by condensation reaction with an aldehyde. The group of phenols suitable for use for condensation with an aldehyde to obtain oil soluble resins suitable for use in the practice of the present invention include both those having saturated and unsaturated side chains and having at least one readily reactive position (ortho or para) on the nucleus unoccupied and generally includes those having from above five to about twenty-six carbon atoms in a substitution group.

The cashew nut shell liquid suitable for use in the practice of the present invention is that removed from the cashew nut shell by cold pressing, by heating at small degree of elevation of temperature or at high elevation, or by extraction with a solvent.

Cardanol is a phenol having a hydrocarbon chain of about fourteen carbon atoms on the nucleus, with an unsaturated group in said chain, and is described in my Patent Number 2,098,824. The molecular weight is about 288.

The phenol-aldehyde condensation products herein described as suitable for the practice of the present invention are liquid or solid resinous products.

The aldehydes suitable for making the phenol-aldehyde condensation products useful in the practice of the present invention are formaldehyde, paraformaldehyde, paraldehyde, acetaldehyde, furfuraldehyde, and also other materials which will supply a reactive methylene group such as hexamethylene-tetramine.

The rotenone bearing materials suitable for use in the practice of the present invention are derris root extract, derris resinate, barbasco, cube, timbo, and other effective insecticidal forms of rotenone, and also chemically or technically pure rotenone.

Examples of the petroleum oils suitable for use in the practice of the present invention are kerosene, gasoline, fuel oil, petrolatum (petroleum jellies), and regular spray oils, for example those having viscosity of from about 70 to about 95 Saybolt.

Particular illustrative examples of insecticide compositions of the present invention are as follows:

Example 1

One part by weight of insecticidal extract of derris root is dissolved in ten parts by weight of a liquid condensation product of formaldehyde and cardanol by warming. When complete solution is obtained there is added one hundred parts by weight of a petroleum spray oil having a viscosity of from 70 to 95 Saybolt, which spray oil goes completely into solution with the other named materials.

The formaldehyde-cardanol condensation product can be made by heating from one-half to one one-quarter moles of formaldehyde with a mole of cardanol, in the presence of ammonia, under a reflux condenser, at about 205° C., for about one hour, and then dehydrated. The resulting condensation product is a liquid resinous material which dissolves rotenone products, is soluble in petroleum oils and will hold rotenone and rotenone material in solution in petroleum oils.

Example 2

A similar product can be made by using urushiol in place of cardanol by the method and in the proportions given in Example 1, above.

Example 3

The method of Example 1, above, is used with the difference that cashew nut shell liquid is used in place of cardanol.

Example 4

A quantity of cashew nut shell liquid is mixed with a mixture comprising about two and a half per cent of its weight of concentrated sulphuric acid and five per cent of its weight of water and gradually brought up to about 300° F., when it is drawn off and filtered to remove precipitated salts of metals naturally occurring in cashew nut shell liquid. These precipitated salts are separated and the so treated cashew nut shell liquid can be used in place of and in substantially the same proportions as the cardanol of Example 1, above.

Example 5

About one mole of cardanol (molecular weight about 288) and one mole equivalent (of reactive methylene group) of hexamethylene tetramine are heated at from about 250° F. to about 270° F. until a resinous condensation product of a heavy molasses consistency is obtained.

This material can be used in the manner and method given in Example 1 to hold rotenone products in solution in petroleum oils.

Example 6

One mole of para-tertiary amyl phenol and from about one to about one and one-quarter mole of formaldehyde are added slowly into sufcient caustic soda solution which is at 125° F. to dissolve the tertiary amyl phenol and the formaldehyde. The solution is left to stand at room temperature for about forty-eight hours after which it is neutralized and dehydrated. The resulting liquid resin is suitable for use in the manner of Example 1 to hold rotenone products in solution in petroleum oils.

General example

The other phenols named above can be used in the same or in a similar method to that given in Example 1 for the preparation and use of the phenol-aldehyde resin, all of them generally and hydrogenated cardanol and the acid treated cashew nut shell liquid of Example 4 when hydrogenated, in particular. Also mixture of two or more of the phenols above cited can be used to suit particular cases.

Certain dilutions of rotenone in petroleum oils, by means of phenol-aldehyde resins, are given above but limitations thereof are not made within the limits of solubility for different ingredients of the general kinds named and for various proportions used to suit a great variety.

The rotenone-phenol aldehyde resin-petroleum oil compositions above described and exemplified are suitable for use and application either with or without water. When used with water they are made into a finely divided emulsion.

Having thus described my invention, what I claim is:

1. In an insecticide, in combination, an insecticidal rotenone product, a petroleum oil, and a phenol-aldehyde condensation product, the phenolic nucleus of which has a long hydrocarbon chain characteristic of the phenols of cashew nut shell liquid, which said condensation product is a common solvent for said rotenone product and said petroleum oil.

2. In an insecticide, in combination, an insecticidal rotenone product, a petroleum oil, and a condensation product of formaldehyde with a phenol derived from the Anacardiaceae family of plants and having the characteristic long-chain substituents of Anacardiaceae phenols, which said condensation product is a common solvent for said rotenone product and said petroleum oil.

3. In an insecticide, in combination, in solution, an insecticidal rotenone product, a petroleum oil, and a phenol-aldehyde condensation product, the phenolic nucleus of which has a hydrocarbon chain of from five to twenty-six carbon atoms, which said condensation product is a common solvent for said rotenone product and said petroleum oil, said rotenone product being present in said solution in effective amounts up to 0.3%, calculated as rotenone.

4. In an insecticide, in combination, an insecticidal rotenone product, a petroleum oil, and phenol-aldehyde resin, the phenolic nucleus of which has a hydrocabron chain of from five to twenty-six carbon atoms, which said resin is a common solvent for said rotenone product and said petroleum oil, and has a tolerance for from about ten times to about one hundred times its own weight of said petroleum oil when from about one tenth to about $\frac{1}{20}$ of its own weight of said rotenone product is dissolved therein, in clear solution.

5. In an insecticide, in combination, an insecticidal rotenone product, a petroleum oil, and a phenol-aldehyde resin, the phenolic nucleus of which has a hydrocarbon chain of from five to twenty-six carbon atoms and which said resin is a common solvent for said rotenone product and said petroleum oil.

6. In a method of making an insecticide, the step which comprises dissolving an insecticidal rotenone product in a phenol-aldehyde condensation product, the phenolic nucleus of which has a hydrocarbon chain of from five to twenty-six carbon atoms, which said condensation product is a solvent for said insecticidal rotenone product and is a solvent for petroleum oils and then adding a soluble petroleum oil.

7. In a method of making an insecticide, the step which comprises dissolving an insecticidal rotenone product in a condensation product of an aldehyde with a phenol derived from the Anacardiaceae family of plants and having the characteristic long-chain substituents of Anacardiaceae phenols, which said condensation product is a solvent for said insecticidal rotenone product and is a solvent for petroleum oils and then adding a soluble petroleum oil.

8. In an insecticide, in combination, an insecticidal rotenone product, a petroleum oil, and a phenol-formaldehyde condensation product the reagent phenol of which was derived from and has a long chain characteristic of the phenols of cashew nut shell liquid which said condensation product is a common solvent for said rotenone product and said petroleum oil.

9. An insecticide comprising a solution of an insecticidal rotenone product in a phenol-aldehyde condensation product, the phenolic nucleus of which said condensation product has a hydrocarbon chain of from five to twenty-six carbon atoms and which said condensation product is a solvent for petroleum oils, and a soluble petroleum oil.

10. An insecticidal solution comprising an insecticide extracted from a rotenone bearing body and a phenol-aldehyde condensation product, the phenolic nucleus of which said condensation product has a hydrocarbon chain of from five to twenty-six carbon atoms and which said condensation product is a solvent for said extracted insecticide and for a petroleum oil, and a soluble petroleum oil.

MORTIMER T. HARVEY.